(12) United States Patent
Lee

(10) Patent No.: US 9,430,311 B2
(45) Date of Patent: Aug. 30, 2016

(54) CAUSE AND EFFECT MAPPING FOR FAILURE MODE EFFECT ANALYSIS CREATION AND RISK MANAGEMENT

(71) Applicant: Halliburton Energy Services, Inc., Houston, TX (US)

(72) Inventor: Daniel Voon Leng Lee, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 116 days.

(21) Appl. No.: 13/948,295

(22) Filed: Jul. 23, 2013

(65) Prior Publication Data

US 2015/0033080 A1    Jan. 29, 2015

(51) Int. Cl.
*G06F 11/00* (2006.01)
*G06F 11/07* (2006.01)

(52) U.S. Cl.
CPC ....... *G06F 11/0766* (2013.01); *G06F 11/0703* (2013.01); *G06F 11/0769* (2013.01)

(58) Field of Classification Search
CPC .......... G06F 11/0766; G06F 11/3409; G06F 11/3466; G06F 11/0778; G06F 11/079; G06F 2201/86
USPC .......................................... 714/47.1, 39, 37
See application file for complete search history.

(56) References Cited

U.S. PATENT DOCUMENTS

| | | | |
|---|---|---|---|
| 5,586,252 A | 12/1996 | Barnard et al. | |
| 6,223,143 B1* | 4/2001 | Weinstock | G06F 11/008 703/17 |
| 6,249,755 B1* | 6/2001 | Yemini | G06F 11/2257 702/181 |
| 7,013,411 B2 | 3/2006 | Kallela et al. | |
| 7,451,063 B2* | 11/2008 | Nelson | G06F 17/50 702/183 |
| 7,681,086 B2 | 3/2010 | Vlassova et al. | |
| 2003/0135786 A1* | 7/2003 | Vollmar | G05B 23/0278 714/25 |
| 2007/0150327 A1* | 6/2007 | Dromgold | 705/8 |
| 2007/0150772 A1* | 6/2007 | Berenbach et al. | 714/25 |
| 2008/0126920 A1 | 5/2008 | Otaka et al. | |
| 2010/0042451 A1* | 2/2010 | Howell | G06F 11/008 705/7.28 |
| 2010/0332889 A1* | 12/2010 | Shneorson | G06Q 10/06 714/2 |
| 2011/0137703 A1* | 6/2011 | Dugan | G06Q 10/0635 705/7.28 |
| 2012/0317058 A1* | 12/2012 | Abhulimen | G06N 99/005 706/2 |
| 2013/0006439 A1* | 1/2013 | Selvaraj et al. | 700/297 |
| 2013/0238379 A1* | 9/2013 | Prieto | G06Q 50/08 705/7.23 |
| 2014/0359366 A1* | 12/2014 | Schwinn et al. | 714/37 |
| 2015/0019187 A1* | 1/2015 | Jones et al. | 703/8 |

OTHER PUBLICATIONS

<http://en.wikipedia.orgiwiki/Failure_mode_and_effects_analysis>, Date Last Modified: Jul. 13, 2013. <http://www.fmea.co.uk/FMEA_software.html>, Dated 2013.

* cited by examiner

*Primary Examiner* — Yair Leibovich
(74) *Attorney, Agent, or Firm* — McDermott Will & Emery LLP; Benjamin Fite

(57) ABSTRACT

Disclosed are methods and computer-readable instructions for capturing and reporting information for a failure mode effects analysis. One method includes populating and generating a cause and effect map via a graphical user interface, the cause and effect map having a plurality of events interconnected with one or more propagation lines and of the plurality of events being associated with one or more potential failures of a component or subsystem of a system, performing a failure mode effects analysis (FMEA) on the cause and effect map, graphically depicting the cause and effect map to reflect risk based on the FMEA, and visually distinguishing at least one of the plurality of events.

20 Claims, 6 Drawing Sheets

CAUSE AND EFFECT MAPPING FOR FAILURE MODE EFFECT ANALYSIS CREATION AND RISK MANAGEMENT

BACKGROUND

The present disclosure relates generally to failure mode effects analysis and, more particularly, to techniques for capturing and reporting information for a failure mode effects analysis.

A failure mode effects analysis (FMEA) is used in various industries as a method to facilitate the capture of areas of concerns for a system and applying risk assessment. An FMEA typically examines potential failure modes and potential causes of an overall system, subsystems and/or components. Risk assessment is applied to each failure mode by means of rating its severity, likelihood of occurrence and ability for detection. Doing such allows operators to prioritize risks and activities, and to make necessary or appropriate design modifications at the system or component level to improve overall system performance and reduce risk of failure.

Conventional FMEA techniques generally require users to enter data into different columns of an FMEA spreadsheet (in paper form or electronically) or other text-based hierarchy format. In all these cases, the FMEA process of capturing risk information into standardized worksheet formats requires participants to follow the procedure of filling in predefined fields. Although effective facilitators can improve the flow of gathering information from participants to entry into the FMEA spreadsheet, the current methods available remains largely text based and often requires participants to tune into the FMEA discipline mode. The text-busy and structured nature of the conventional FMEA continue to be a challenge for all facilitators to engage participants for effective results and require extensive time, and thus cost, to a company.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
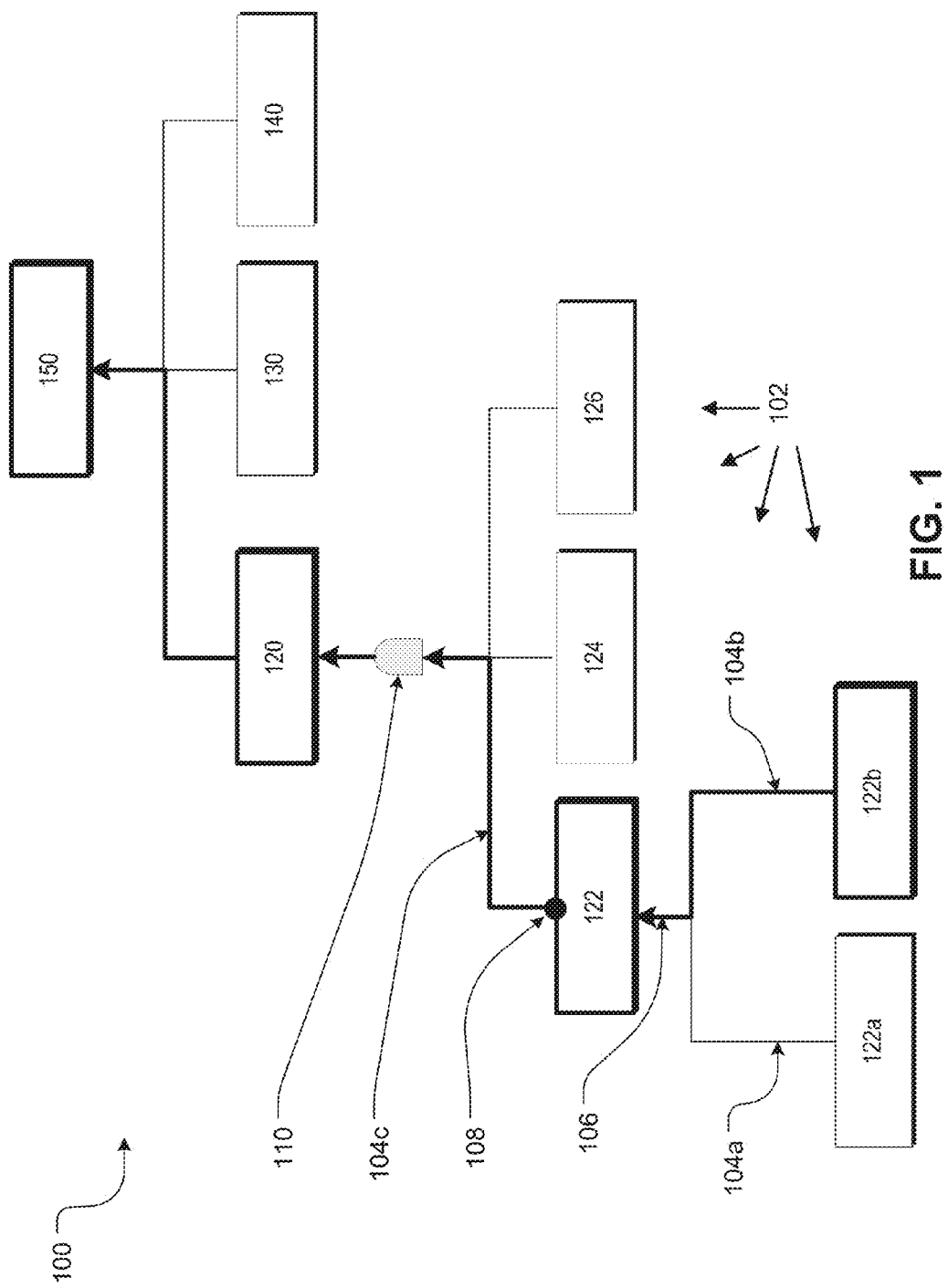
FIG. 1 illustrates a graphical representation of a cause and effect map for a failure mode effects analysis (FMEA), according to one or more embodiments.

The present disclosure relates generally to failure mode effects analysis and, more particularly, to techniques for capturing and reporting information for a failure mode effects analysis.

A failure mode effects analysis (FMEA) is used in various industries as a method to facilitate the capture of areas of concerns for a system or project while applying risk assessment. An FMEA typically examines potential causes of a component defect or failure, and the likelihood of that defect or failure occurring. As a system may fail due to underlying causes of sub-components or subsystems, an FMEA allows analysis of the overall system to determine where failure may originate and what affect or severity a component failure may have on the overall system. The results of an FMEA may then be used by engineers or operators to make any necessary design modifications at the system or component level to improve overall system performance and reduce future risk of failure.

The FMEA information is typically stored in the form of a computerized spreadsheet or method displaying individual failure modes of the system, subsystem or components on a line-by-line basis. This form of visual data representation is largely text-busy and makes it very hard for the engineer to see the overall system, and further to track faults through subsystems in order to determine the point of fault origination. As such, immense time is typically necessary for a thorough FMEA analysis.

The present disclosure includes methods of generating and displaying a cause and effect map, which reduces FMEA analysis time by allowing direct visual representation of failure modes and its associated risks of the system, subsystem and components, all in one map. A visual cause and effect map engages participants by displaying selected FMEA information in a hierarchical tree-like structure, representing a map of causal events that ultimately lead to undesirable consequences. The logical top down nature of a cause and effect map allows for a simpler application of the FMEA risk management, for example, by allowing risk assessment to multiple levels of details that would otherwise normally require separate conventional FMEAs and repeated risk assessment activity, thus saving time and expense. The method may also allow progressive distillation of causes to lower level events based on risk. In this approach, operators may choose to stop at a system level causal event if the risk at that event is determined as low, while expanding to lower level causes for causal events with higher risks, thus saving cost.

While display of FMEA information in the form of cause and effect diagrams may be known in the art as a fishbone diagram (or Ishikawa diagram), these typically require either a spreadsheet or database to build the cause and effect map. Further, they do not allow for direct user interaction, and do not automatically update to visually represent a new FMEA and failure analysis. The present disclosure provides methods to generate, update, and display the cause and effect map in ways that will save time and money. One of skill in the art will recognize that such visual representation will prove to be more efficient and effective than the typical FMEA analysis method of filling in a spreadsheet or a fixed hierarchy system in a meeting, and then being constrained by the conventional column-by-column and line-by-line approach.

Referring to FIG. 1, illustrated is an exemplary cause and effect map 100 for an exemplary FMEA, according to one or more embodiments. The phrase "cause and effect map" may also be known in the art as a "fault tree" or "fault map," and therefore such terms may be used interchangeably herein. As illustrated, the cause and effect map 100 identifies a plurality of failure events 102 ("events"), shown in FIG. 1 as events 150, 120, 130, 140, 122, 124, 126, 122a, and 122b.

An event 102 represents one or more causes of failure (a "causal" event) for a system, subsystem, or component (e.g., a screw breaking or becoming unscrewed). Each event 102 may be visually connected to one or more other events 102, thereby forming a cause-and-effect relationship between such interconnected events 102. Thus, one or more events 102 will be the "cause" or "causal event," and a second event 102 will be the "effect" event 102 resulting from such cause. The propagation of risk information between causal and effect events is visually displayed via propagation lines 104a-c. Where multiple causes may lead to a single effect, the propagating risks may merge upon an input location, such as at input 106, or may be put through a weighted calculation, such as displayed by risk calculation 110. An event may also be programmed to "override" a particular propagation line 104a-c, such as embodied by override indicator 108.

Each event 102 may contain information relating to a component or subsystem, such as a severity ranking (i.e., how severely a failure may damage upper level systems), a detection ranking (i.e., how well a failure may be detected), an occurrence ranking (i.e., how often a failure may occur), a criticality number, and/or a risk priority number (RPN). As will be discussed below with reference to FIG. 3, this information may be input by a user via one or more graphical user interfaces. One exemplary method for calculating the criticality number of an event 102 may be multiplying the event severity ranking by the event occurrence ranking. One exemplary method for calculating the RPN of an event 102 may be multiplication of the severity ranking, occurrence ranking, and detection ranking of the event 102.

In the illustrated example of FIG. 1, events 122a and 122b represent components at the lowest level of the hierarchical system. Failures of events 122a or 122b will propagate through the system and may create a failure effect of event 150, where event 150 represents the highest level of the system. Thus, each of causes 120, 130 and 140 may represent a high-level subsystem including multiple components at progressively lower levels of complexity. Further, cause 120 itself may be an effect of causes 122, 124 and 126 at a lower level of the hierarchy represented by visual map 100.

Each propagation line 104a-c represents the risk priority number (RPN) flowing from a "causal" event, and propagating to an "effect" event. For example, event 122a may represent a causal event, where the RPN of event 122a is propagated via propagation line 104a to the "effect" event 122. In other words, event 122a may cause or otherwise result in the failure at event 120. This cause and effect connect also makes readily apparent that an event 102 may be an "effect" event but, in turn, may also be a "cause" event. For example, while event 122 may be an effect event from failure of event 122a, event 122 may also be a causal event leading to event 120. Visual differences of propagation lines 104a-c are discussed further below.

When multiple events 102 are used in combination to form a subsystem, this may be reflected by their respective propagation lines merging, such as seen with 104a and 104b merging into input 106 of the effect event 122. As such, the effect event 122 must handle the possible combined risks of events 122a,b. In one embodiment, a particular event 102 may retain the highest risk and discard or disregard all other risks, as the highest risk will be what the engineers are most concerned about solving or preventing. In another embodiment, such as visualized by risk calculation 110, a weighted formula may be used to select which risk passes through. The weighted formula may implement calculations known or used by one of skill in the art for fault tree analysis, including use of conditional algorithms based on information propagated to risk calculation 110 from input events, such as event 122, 124, or 126.

As previously discussed, each event 102 may include information such as an occurrence ranking, a detection ranking, and a severity ranking. While this information (the occurrence, detection, and severity rankings) may be taken into account to calculate the RPN of the final event 102, one of skill in the art will appreciate that this information may be propagated via "upward" and "downward" inheritance in between events 102 prior to doing so.

For instance, information such as occurrence and detection ranking of an event 102 likely uses "upward" inheritance, flowing from an event 102 that is lower in the hierarchy to one or more higher level events 102. However, the severity of failure by a lower level event 102 likely is not known until "downward" inheritance is used, and the severity information is inherited by the lower-level event 102 from the higher-level events 102. In other words, severity ranking of a lower level event 102 is inherited from the top event 102, and propagated to everything below the top event 102. For example, occurrence and detection ranking of event 122b is likely propagated "upward" to event 122, then to event 120, and finally to event 150. However, the severity of this failure is likely "downward" inherited, where event 150 sends information to its lower events 120, 130, 140, thus down to events 122, 124, and 126, and thus from event 122 down to events 122a and 122b. Upon all of this information being propagated in appropriate directions, an RPN for each event 102 and propagation lines 104a-c may be calculated.

As discussed above, the program may also have the capability to "override" some of the propagation, as accomplished by override indicator 108. This may be used when more information is known about a particular mid-level event 102 (e.g., event 122) than the lower-level events 102 (e.g., 122a and 122b). While lower-level events 122a and 122b may be included for completeness of the entire system, little may be known about the component or what may cause the component to fail, thus causing incorrect calculations and an incorrect FMEA if taken into account. Therefore, event 122 may be configured to "override" its default output with alternative user-input constants or other programmed calculations, as dictated by the override indicator 108.

Figure 2B:
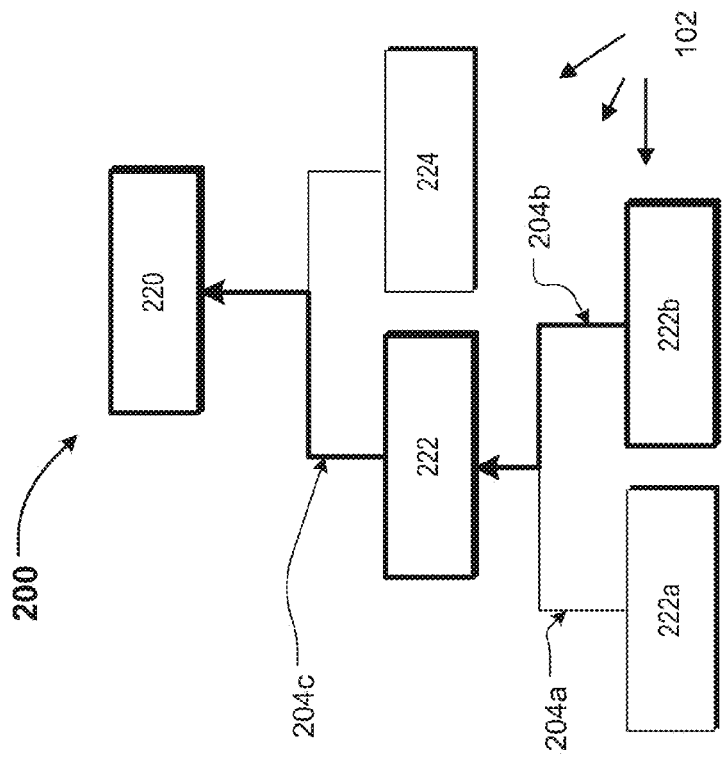
FIGS. 2A and 2B illustrate visually distinguishing risk in a cause and effect maps, according to one or more embodiments.
Figure 2A:
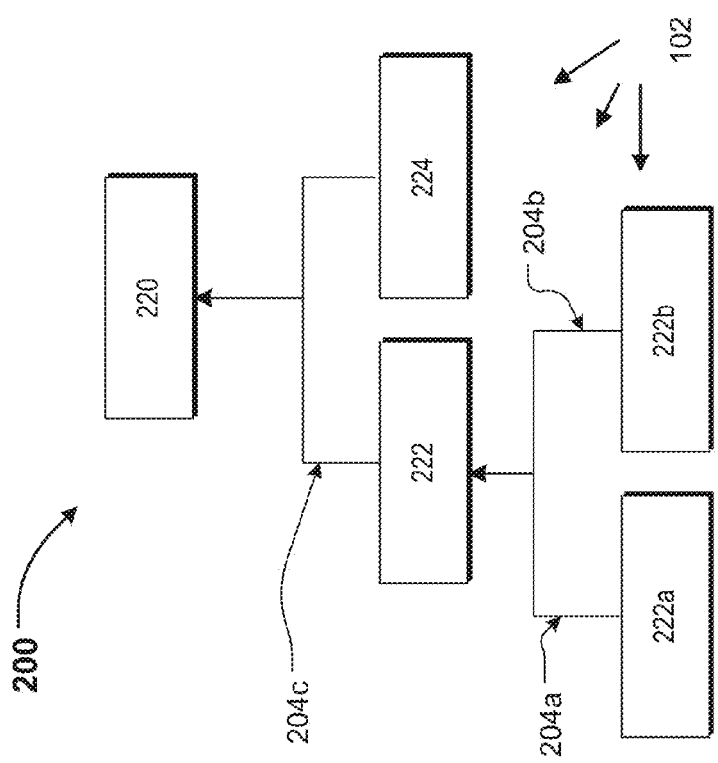

As discussed in more detail in FIGS. 2A and 2B, cause and effect map 100 may also visually reflect risk to the user by altering, for example, the border thickness for particular events 102, the thickness of one or more propagation lines 104a-c, or the corresponding color of the affected events 102 and/or propagation lines 104a-c.

The cause and effect map 100 may be generated using any variety of programming languages such as, but not limited to, visual basic. Further, with respect to cause and effect map 100, any one of the events 102 may represent a cause or effect event for a component, subsystem or system. Additionally, while cause and effect map 100 displays a causal event (e.g., event 122a) only propagating failure information to a single effect event (e.g., event 122), one of skill in the art will appreciate that propagation from a causal event may lead to a plurality of effect events, without departing from the scope of the disclosure.

Referring now to FIGS. 2A and 2B, with continued reference to FIG. 1, illustrated is an exemplary cause and effect map 200 encompassing exemplary FMEA and risk, according to one or more embodiments. Cause and effect map 200 is substantially similar to cause and effect map 100 (FIG. 1), and may therefore be best understood with reference thereto. Similar to cause and effect map 100 of FIG. 1, cause and effect map 200 may include a plurality of events 102, depicted herein as events 220, 222, 224, 222a, and 222b. Again, as will be discussed in greater detail below with reference to FIG. 3, a user may input or edit event information via one or more graphical user interfaces. Each event 102 may be interconnected with corresponding propagation lines 204a-c that illustrate or otherwise facilitate information propagating between events adjacent 102.

FIG. 2A and FIG. 2B illustrate an embodiment of visually distinguishing risk in a cause and effect map due to varying information of one or more events 102. Examples of these visual differences include changing the border thickness for a particular event 102, thickness of one or more propagation lines 204a-c, and coloring effects of both the borders of a particular event 102 and/or one or more propagation lines 204a-c. As will be appreciated, such visual representations and changes quickly and easily display degrees of risk to the user and/or engineers referencing the map 200.

In one embodiment, the border thickness of an event 102 may vary due to a particular occurrence rating assigned to events 102. For example, the occurrence rating for a particular event 102 may be predefined, such as by allowing a user to assign a value ranging from 1 to 5 to such an event 102. When said event 102 has a low failure occurrence, the user may assign a value of 1 for the occurrence rating for that event 102. As a result, the border for said event 102 may be thinned or otherwise less bold than adjacent events, thereby indicating to a user that the event 102 exhibits a low occurrence rating. However, when a particular event 102 has a high failure occurrence, the user may assign a value of 5 for the occurrence rating of that event 102. As a result, the border for said event may be made thicker or bolder than adjacent events, such as is depicted with events 222b, 222, and 220 in FIG. 2B.

Where a user inputs a high value for detection ranking of an event 102, meaning that there is a lower likelihood of detecting a failure for that event 102, the thickness of the corresponding propagation lines 204a-c may also be changed or otherwise vary. For example, in FIG. 2A, if the detection ranking for event 222b has a low value, propagation line 204b may be thin. Following previously discussed "upward" inheritance, this low detection ranking is inherited by event 222, and the resulting propagation line 204c may also be depicted as thin. However, as seen in FIG. 2B, if the detection ranking for event 222b has a high value (meaning that there is a low likelihood of detecting a failure), propagation line 204b may be thick. Thus, again, following "upward" inheritance, this high detection ranking is inherited by event 222, and the resulting propagation line 204c may also be thick. This clearly indicates to the user that the system has a poor detection of a certain fault, but also outlines the path to which event 102 may be the root error.

In a further embodiment, the graphically displayed color of a particular event 102 and/or a corresponding propagation line 204a-c may change due to the RPN calculated for an event 102. As previously discussed, one method of calculating the RPN for an event 102 may be to multiply the severity ranking, the occurrence ranking, and/or the detection ranking of the event 102. In one embodiment, a low RPN number could be displayed on a gradually changing and blended color scale where, for example, blue or green represent low risk. As the RPN for an event 102 increases (i.e., greater risk of failure), this color map may blend into yellow or orange, for instance. When the RPN is great (i.e., indicating high risk of failure), the color for the particular event 102 and corresponding propagation line 204a-c may indicate dark orange or red.

As will be appreciated, such color changes may be applied to any part of the cause and effect map 200 including, but not limited to, the border or shading of an event 102 and the color of a propagation line 204a-c. As an example, if the RPN for event 222a in FIG. 2B is low, the border of event 222a may be green or yellow. Further, the corresponding propagation line 204a may inherit this RPN value and also change its color to green or yellow. However, if the RPN for event 222b is high, the border of event 222b may be changed to orange or red and the corresponding propagation line 204b may likewise be changed to orange or red.

Figure 3:
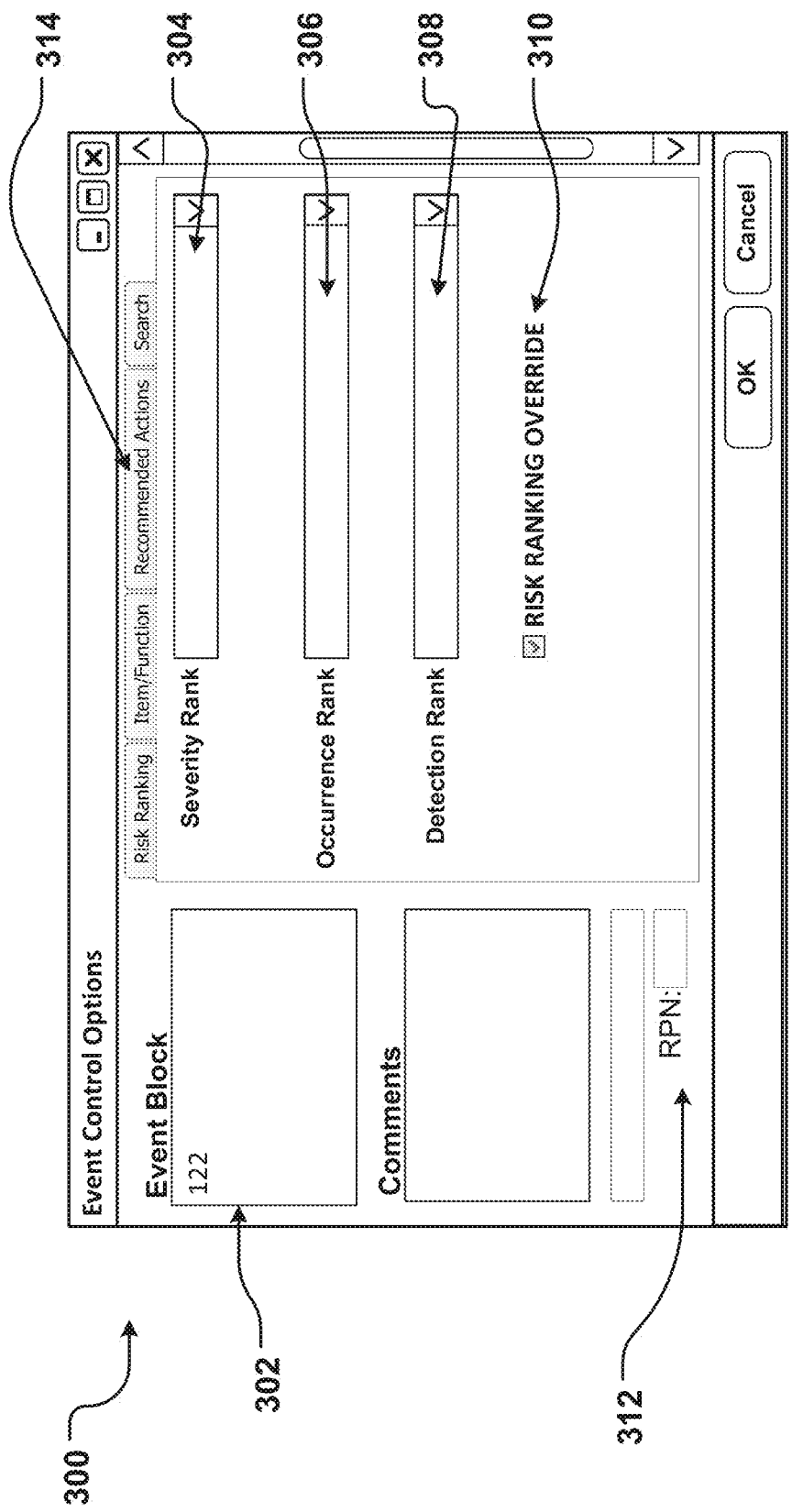
FIG. 3 illustrates an exemplary graphical user interface for receiving and displaying information related to a causal event block of a cause and effect map, according to one or more embodiments.

Referring now to FIG. 3, with continued reference to FIG. 1 and FIGS. 2A and 2B, illustrated is an exemplary graphical user interface (GUI) 300 for receiving and displaying information related to a causal event block of a cause and effect map, according to one or more embodiments. In one embodiment, the GUI 300 allows the user to assign and/or edit information regarding events 102 (FIG. 1). Such a GUI 300 may allow a user to input or edit information for multiple fields, such as an event block name 302, an event severity ranking 304, an occurrence ranking 306, a detection ranking 308, and a risk override enablement 310.

Figure 4:
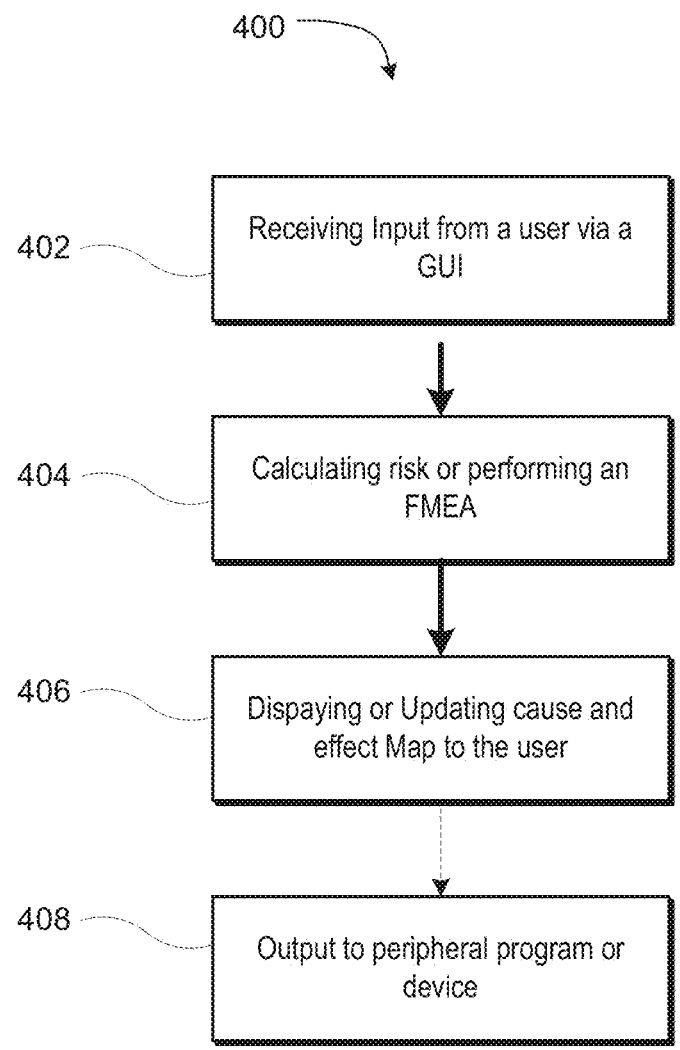
FIG. 4 is a flow chart depicting a method of creating and updating a graphical representation of a cause and effect map, according to one or more embodiments.

The GUI 300 may also allow a user to associate a specific event to a component, subsystem, system, component's function, subsystem's function and system's function as stored in a database (discussed further in FIG. 4). In addition to receiving or editing user input, the GUI 300 may also display information, such as the RPN 312, to the user. Such information may be obtained from memory or from a central database. All fields, both input and output, may be located on one or more tabs 314. In the present example, GUI 300 is associated with event 122 of FIG. 1, as displayed by the information in the event block field 302. Further, the risk ranking override 310 has been selected, as also indicated by risk override indicator 108 (FIG. 1).

In another embodiment, the program may enable the user to search for desired information within event blocks of the cause and effect map. This search may done through the same GUI 300 as users assign and/or edit information, such as having a tab 314 with various search options known to those skilled in the art. Alternatively, a separate GUI (not shown) may be designed and used solely for search purposes. Upon searching, the program may give the user various options for displaying such search results. For example, the program may allow easier visualization of event blocks containing the information searched for by highlighting one individual event that includes the information searched for. Additionally, the program may highlight all event blocks with the information searched for, without departing from the scope of the disclosure.

One of skill in the art will appreciate that each event is not required to use a single individual GUI for user input. Rather, GUI's may be built and used as requested by the user or suited for the specific event being configured.

Referring now to FIG. 4, with continued reference to FIGS. 1-3, illustrated is a flow chart depicting a method 400 of creating and updating a graphical representation of a cause and effect map, according to one or more embodiments. This method 400 may encompass the initial creation of the cause and effect map or otherwise the undertaking of various changes and/or updates to an existing cause and effect map. Notably, updates include both assigning and/or updating information via a GUI (e.g., GUI 300 of FIG. 3), but also updating the cause and effect map by creating or updating connections (e.g., propagation lines 104a-c of FIG. 1) between event blocks.

At 402, a program receives input from a user via a GUI. In one embodiment of the present disclosure, for initial creation of the visual cause and effect map, this may include placing down "blocks" from a user programming palette. These palette blocks, for example, may be items such as events 102 (FIG. 1), propagation lines 104a-c (FIG. 1), or a risk calculator 110 (FIG. 1). Upon placing down such blocks, a GUI (e.g., GUI 300 of FIG. 3) may then be displayed to the user for input of various points of information. Such information may include assigning the event block to a pre-defined component or subsystem stored in a database (i.e., assigning the event block to a "function"). Alternatively, manual input alone may be appropriate, for example, when using risk override functionality for an event block.

If a cause and effect map is already built, the GUI may allow the user to update information already forming part of the cause and effect map. Further, as briefly stated, one of skill in the art will appreciate that "creating" or "updating" the cause and effect map also includes connecting events together (or altering event connections) via visual propagation lines (e.g., propagation lines 104a-c of FIG. 1).

At 404, upon input or alteration of information, the program may store the information, possibly in a memory or a database, and then calculate or re-calculate risk. For example, as previously discussed, the RPN of an event may be calculated by multiplying the severity ranking, occurrence ranking, and detection ranking of that event 102. Thus, if the severity, occurrence, or detection rankings are changed by a user, the RPN will need to be re-calculated.

These calculations may occur on-the-fly, such that the program immediately reflects such calculation to the user (for example, reflected in RPN display 312 (FIG. 3)). Alternatively, the program may recalculate risk upon completion of all information and exiting from the input GUI. One of skill in the art will appreciate that any calculation discussed herein need not be automatically reflected. A user may prefer to manually control when re-calculations are performed due to very large cause and effect maps possibly requiring lengthy calculation and processing times.

At 406, upon completion of risk or FMEA calculations, the information is then displayed to the user via a visually updated cause and effect map. In one embodiment, similar to visual representations discussed in FIG. 2, this may include updating the cause and effect map to reflect appropriate event border or propagation line thicknesses, and associated color update reflecting risk (RPN).

At 408, the information stored in the database may be output to one or more peripheral programs or devices. For example, the program may output the cause and effect map to a monitor for the user to view and consider. Alternatively, the cause and effect map may be sent to a printer or the like. In one embodiment, the cause and effect map information may be output in a spreadsheet format (further discussed in FIGS. 5A and 5B, below). This format may be custom to the user's needs, or built to reflect industry standards. Alternatively, the program may output information in such a format as to be used or processed by other databases, for example xFMEA.

It will be appreciated that the foregoing method 400 is merely one embodiment of the present disclosure and should not be considered as limiting or all inclusive of events that may or must take place. Moreover, the order of steps or blocks in the method 400 need not be precisely followed. Indeed, assigning information, performing calculations, and displaying information may be performed in a variety of steps, orders, or repetitions, and as best suited for the user's needs.

Figures 5A, 5B:
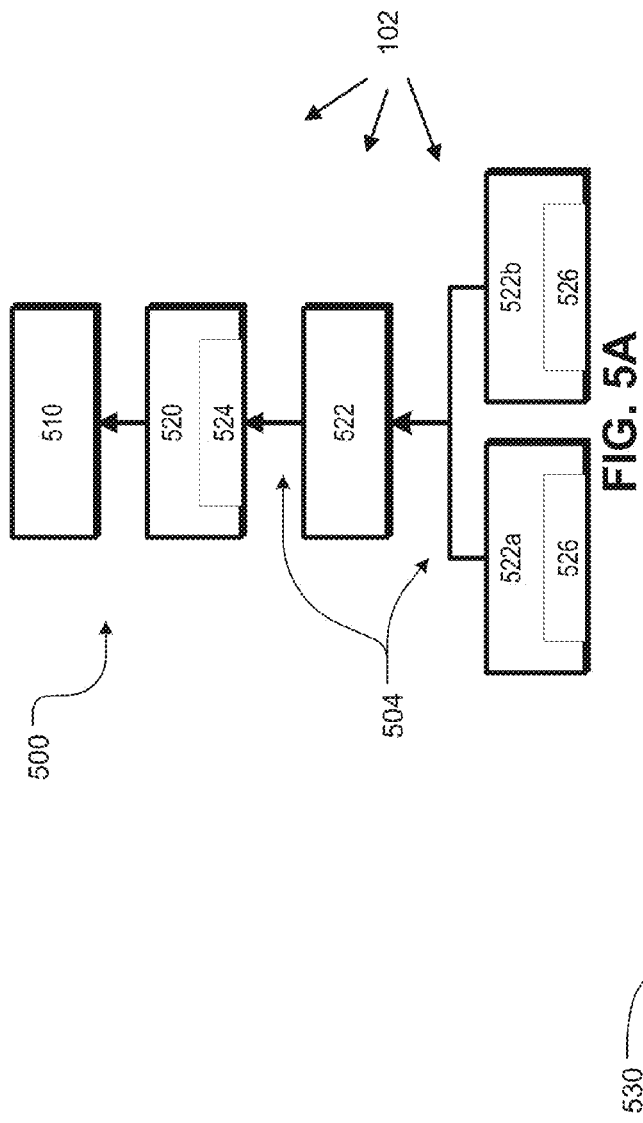
FIGS. 5A and 5B illustrate a related cause and effect map and FMEA worksheet, respectively, according to one or more embodiments.

Referring now to FIGS. 5A and 5B, with continued reference to FIGS. 1-4, illustrated is an exemplary cause and effect map 500 and corresponding FMEA worksheet 530, according to one or more embodiments. More particularly, the exemplary FMEA worksheet 530 of FIG. 5B may be automatically generated as based on the graphical cause and effect map 500 of FIG. 5A. Moreover, the FMEA worksheet 530 may include or otherwise depict function assignments of various causal event blocks derived from FIG. 5A.

The cause and effect map 500 of FIG. 5A includes multiple events 102 and propagation lines 504 with characteristics identical to that of cause and effect map 100 of FIG. 1. Cause and effect map 500 is merely a smaller cause and effect map as compared to cause and effect map 100, and is illustrated to facilitate discussion of its transformation into the FMEA spreadsheet 530 of FIG. 5B. Cause and effect map 500 contains a plurality of failure events 102, including events 510, 520, 522, 522a, and 522b. Certain failure events visually depict an associated subsystem. For example, failure of subsystem 524 will cause event 520. Subsystem 526 is illustrated as having multiple independent instances. A first instance of subsystem 526 is associated with event 522a, and a second instance of subsystem 526 is associated with event 522b. As previously discussed, this association may have been performed by a user via a GUI such as GUI 300 (FIG. 3). In cause and effect map 500, similar to cause and effect map 100, events 510, 520, 522, 522a, and 522b may be interconnected via propagation lines 504 that are substantially similar in form and function to propagation lines 104a-c of FIG. 1.

In FIG. 5B, spreadsheet 530 illustrates part of an exemplary FMEA spreadsheet programmatically generated from cause and effect map 500. The spreadsheet 530 may contain information such as function name, failure mode, the effects of a failure ("Effects"), causes of a failure ("Causes"), and the severity ranking, occurrence ranking, detection ranking, and RPN of a particular event. In one embodiment, the program may generate the spreadsheet 530 by using the function assignments made by the user for cause and effect map 500. As previously discussed, each event may be associated with a subsystem (the subsystem possibly implemented and referred to as a "function" for programming purposes). In spreadsheet 530, function names used correspond to subsystems they represent. Thus, function name "Subsystem 524" corresponds to subsystem 524 (FIG. 5A). Accordingly, "Failure Mode" (FIG. 5B) for function Subsystem 524 is event 520. Similarly, function name "Subsystem 526" (FIG. 5B) corresponds to subsystem 526 (FIG. 5A), and spreadsheet 530 contains a row for each associated event, 522a, 522b.

Spreadsheet 530 illustrates, for example, both the cause and effects for event 520 in FIG. 5A. Spreadsheet 530 illustrates that subsystem 524 may cause failure event 520 if there is a causal event of 522 (FIG. 5A). Further, spreadsheet 530 illustrates that event 520 will result in an effect event of 510. Additionally, spreadsheet 530 illustrates possible causal strings of event 520. Specifically, a cause may be event 522. Further, event 522 may have been caused by event 522a. Alternatively, event 522 may have been caused by event 522b.

Spreadsheet 530 also illustrates the cause and effects for event 522a and event 522b. Events 522a and 522b are illustrated in spreadsheet 530 as failure modes to subsystem 526. However, the "causes" column of spreadsheet 530 is blank for event 522a and event 522b, illustrating that these may be the lowest resolution of cause as depicted by the cause and effect map in FIG. 5A. In one embodiment, this may also signal events 522a and 522b to be actionable root causes.

In another embodiment, spreadsheet 530 may also illustrate the result of risk ranking inheritance from the cause and effect map. In spreadsheet 530, the column "severity ranking" illustrates that the severity risk ranking of an event 102 is equal to the last effect event 102. For example, in FIG. 5A, all events 102 lead to end effect event 510. This is reflected in spreadsheet 530 (FIG. 5B) as the severity of event 510 ("Sev. Of 510") is listed in the Severity Ranking column for all functions. In cases where there are more than one end effect (not shown), the highest severity will be used. Spreadsheet 530 also illustrates that occurrence and detection ranking is equal to the lowest event of the cause and effect map 500. Thus, in spreadsheet 530, there are no causes listed in the "causes" column for events 522a and 522b, and the Occurrence Ranking and Detection Ranking columns have inherited information equal to the event listed in the column "Failure Mode".

Figure 6:
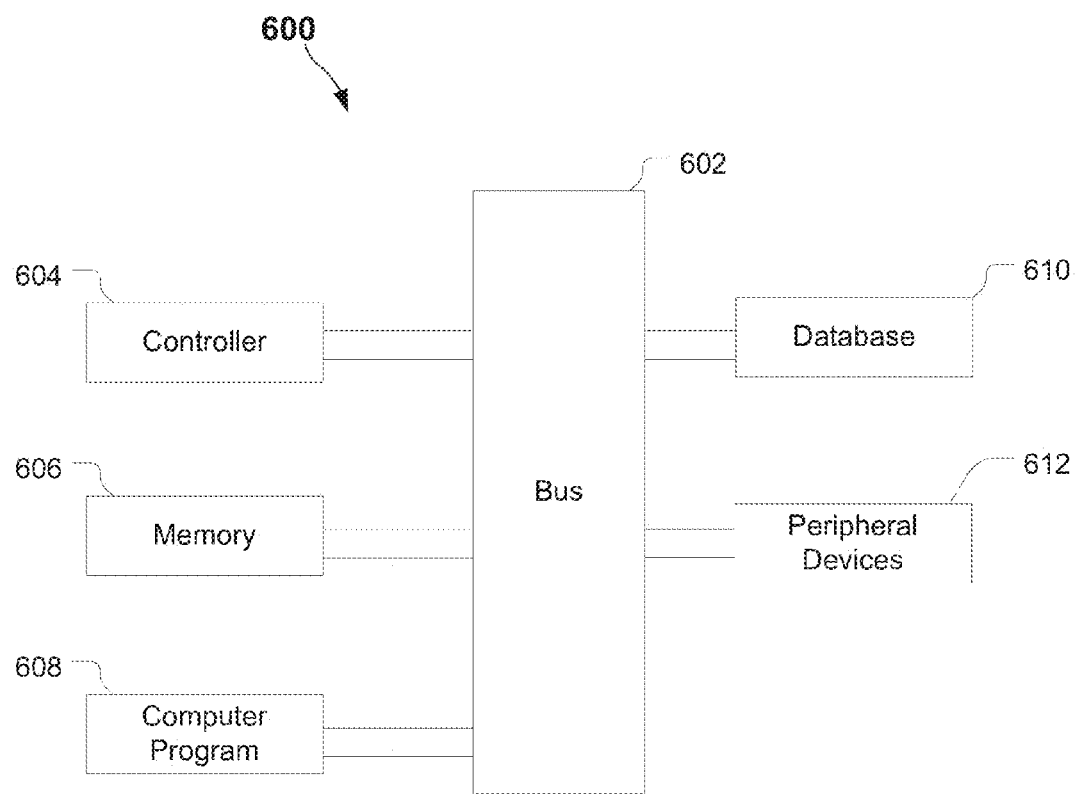
FIG. 6 is a schematic diagram of an exemplary computer system in which principles of the present disclosure may be implemented, according to one or more embodiments.

Referring now to FIG. 6, illustrated is a schematic diagram of an exemplary computer system 600 in which the present disclosure may be implemented, according to one or more embodiments. The computer system 600 may include a bus 602, a processor/controller 604, a non-transitory machine-readable medium (i.e., a memory) 606, a computer program 608, one or more databases 610, and one or more peripheral devices 612.

The bus 602 may provide electrical conductivity and a communication pathway among the various components of the computer system 600. The processor 604 may be configured to execute one or more sequences of instructions, programming stances, or code stored on a non-transitory computer-readable medium, such as the memory 606. The processor 604 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data.

As used herein, a machine-readable medium (i.e., a memory) 606, refers to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

The computer program 608 may be a set of executable sequences programmed to carry out the functions described above in generating, populating, and otherwise displaying the maps, spreadsheets, etc. Executable sequences described herein can be implemented with one or more sequences of code contained in a memory. In some embodiments, such code can be read into the memory 606 from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

The computer program may communicate with a database 610 to store or retrieve information. The computer program may also implement use of peripheral devices 612. Such peripheral devices may include forms allowing user input, such as a keyboard, mouse, or touchscreen. Peripheral devices may also include output devices, such as a monitor, printer, or additional storage memory. Further, peripheral devices also include other computer systems or programs that may interact with computer system 600.

In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method, comprising:
   populating and generating a cause and effect map via a graphical user interface, the cause and effect map having a plurality of events at multiple levels of hierarchy and interconnected with one or more propagation lines, and at least one of the plurality of events being associated with one or more potential failures of a component or subsystem of a system;
   performing a failure mode effects analysis (FMEA) on the cause and effect map;
   graphically depicting the cause and effect map to reflect risk based on the FMEA; and
   visually distinguishing a first event at a level of hierarchy from a second event at the level of hierarchy to display different degrees of risk associated with the first and second events.

2. The method of claim 1, wherein visually distinguishing the first event from the second event comprises varying a color of one of the first and second events.

3. The method of claim 1, wherein visually distinguishing the first event from the second event comprises varying a border thickness of one of the first and second events.

4. The method of claim 1, wherein visually distinguishing the first event from the second event comprises varying a color of the propagation lines associated with one of the first and second events.

5. The method of claim 1, wherein visually distinguishing the first event from the second event comprises varying a thickness of the propagation lines associated with one of the first and second events.

6. The method of claim 1, further comprising storing the cause and effect map information in a database associated with the system.

7. The method of claim 1, further comprising searching the cause and effect map for desired information.

8. The method of claim 1, further comprising using data derived from the cause and effect map by a third-party program.

9. The method of claim 1, further comprising generating a representation of the cause and effect map in the form of an FMEA spreadsheet.

10. The method of claim 9, wherein the FMEA spreadsheet comprises a list of possible causes and a list of possible further failures for at least one of the plurality of events.

11. The method of claim 1, further comprising overriding an event output from at least one of the plurality of events using alternative user-input constants or programmed calculations.

12. The method of claim 1, further comprising selectively passing data to at least one effect event of the plurality of events by applying a weighted formula to the data.

13. The method of claim 1, further comprising modifying the cause and effect map by inputting alternative or additional information.

14. A non-transitory computer readable medium including computer-readable instructions stored thereon which, when executed by a processor, configure the processor to perform functions including:
   generating a cause and effect map populated via a graphical user interface, the cause and effect map having a plurality of events at multiple levels of hierarchy and interconnected with one or more propagation lines, at least one of the plurality of event being associated with one or more potential failures of a component or subsystem;
   performing a failure mode effects analysis (FMEA) on the cause and effect map;
   graphically depicting the cause and effect map to reflect risk based on the FMEA; and
   visually distinguishing a first event at a level of hierarchy from a second event at the level of hierarchy to display different degrees of risk associated with the first and second events.

15. The non-transitory computer readable medium of claim 14, wherein visually distinguishing the first event from the second event comprises at least one of varying a color of one of the first and second events, and varying a border thickness of one of the first and second events.

16. The non-transitory computer readable medium of claim 14, wherein visually distinguishing the first event from the second event comprises at least one of varying a color of the propagation lines associated with one of the first and second events, and varying a thickness of the propagation lines associated with one of the first and second events.

17. The non-transitory computer readable medium of claim 14, further comprising searching the cause and effect map for desired information.

18. The non-transitory computer readable medium of claim 14, further comprising generating a representation of the cause and effect map in the form of an FMEA spreadsheet, the FMEA spreadsheet comprising a list of possible causes and a list of possible further failures for at least one of the plurality of events.

19. The non-transitory computer readable medium of claim 14, further comprising overriding an event output from at least one of the plurality of events using alternative programmed calculations.

20. The non-transitory computer readable medium of claim 14, further comprising selectively passing data to at least one effect event of the plurality of events by applying a weighted formula to the data.

* * * * *